United States Patent
Borrelli et al.

(10) Patent No.: US 11,286,197 B2
(45) Date of Patent: Mar. 29, 2022

(54) SOLARIZATION RESISTANT RARE EARTH DOPED GLASSES

(71) Applicant: CORNING INCORPORATED, Corning, NY (US)

(72) Inventors: Nicholas Francis Borrelli, Elmira, NY (US); Joseph Francis Schroeder, III, Lindley, NY (US); Wageesha Senaratne, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/474,336

(22) PCT Filed: Dec. 18, 2017

(86) PCT No.: PCT/US2017/066931
§ 371 (c)(1),
(2) Date: Jun. 27, 2019

(87) PCT Pub. No.: WO2018/125625
PCT Pub. Date: Jul. 5, 2018

(65) Prior Publication Data
US 2019/0337835 A1    Nov. 7, 2019

Related U.S. Application Data

(60) Provisional application No. 62/440,042, filed on Dec. 29, 2016.

(51) Int. Cl.
*C03C 3/095* (2006.01)
*C03C 4/00* (2006.01)
(Continued)

(52) U.S. Cl.
CPC ............. *C03C 3/095* (2013.01); *C03C 3/087* (2013.01); *C03C 3/118* (2013.01); *C03C 4/0085* (2013.01);
(Continued)

(58) Field of Classification Search
CPC ......... C03C 3/095; C03C 3/087; C03C 3/118; C03C 4/0085; C03C 2201/3423;
(Continued)

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |

(Continued)

FOREIGN PATENT DOCUMENTS

| | | | |
|---|---|---|---|
| CN | 1131130 A | 9/1996 | |
| CN | 1224699 A | 8/1999 | |

(Continued)

OTHER PUBLICATIONS

CN105859128A machine translation (Year: 2016).*
(Continued)

*Primary Examiner* — Karl E Group
*Assistant Examiner* — Cameron K Miller
(74) *Attorney, Agent, or Firm* — Ryan T. Hardee (57) ABSTRACT

Substantially alkali free glasses are disclosed which can be used to produce substrates for flat panel display devices. The glasses can have a loading of fluorine and ceria to achieve exemplary solarization and UV protection attributes when exposed to UV radiation. Methods for producing substantially alkali free glasses using a float or downdraw process (e.g., a fusion downdraw process) are also disclosed.

20 Claims, 3 Drawing Sheets

(51) Int. Cl.
*C03C 3/087* (2006.01)
*C03C 3/118* (2006.01)
(52) U.S. Cl.
CPC ............... *C03C 2201/3423* (2013.01); *C03C 2201/3441* (2013.01); *C03C 2201/3447* (2013.01); *C03C 2201/36* (2013.01)
(58) Field of Classification Search
CPC .... C03C 2201/3441; C03C 2201/3447; C03C 2201/36
See application file for complete search history.

(56) References Cited

U.S. PATENT DOCUMENTS

| | | | |
|---|---|---|---|
| 4,257,811 A | 3/1981 | Jahn | |
| 4,746,634 A | 5/1988 | Danielson | |
| 5,525,553 A * | 6/1996 | Brocheton | C03C 3/095 501/64 |
| 5,785,726 A | 7/1998 | Dorfeld et al. | |
| 5,824,127 A | 10/1998 | Bange et al. | |
| 5,925,468 A | 7/1999 | Stewart | |
| 6,128,924 A | 10/2000 | Bange et al. | |
| 6,323,585 B1 * | 11/2001 | Crane | C03C 3/06 313/112 |
| 6,465,381 B1 | 10/2002 | Lautenschlager et al. | |
| 6,677,260 B2 | 1/2004 | Crane et al. | |
| 6,680,266 B1 * | 1/2004 | Peuchert | C03C 3/091 313/636 |
| 7,628,038 B2 | 12/2009 | Deangelis et al. | |
| 7,628,039 B2 | 12/2009 | Deangelis et al. | |
| 7,696,113 B2 | 4/2010 | Ellison | |
| 2010/0288351 A1* | 11/2010 | Speit | H01L 31/0749 136/256 |
| 2013/0225390 A1* | 8/2013 | Ellison | C03C 3/093 501/66 |
| 2013/0244859 A1* | 9/2013 | Kawaguchi | C03C 3/091 501/66 |
| 2014/0179510 A1* | 6/2014 | Allan | C03C 3/091 501/67 |
| 2014/0376868 A1 | 12/2014 | Ritter et al. | |
| 2018/0305244 A1 | 10/2018 | Borrelli et al. | |

FOREIGN PATENT DOCUMENTS

| | | |
|---|---|---|
| CN | 1284481 A | 2/2001 |
| CN | 101885580 A | 11/2010 |
| CN | 105859128 A * | 8/2016 |
| DE | 102009029086 A1 | 3/2011 |
| EP | 0999574 A1 | 5/2000 |
| GB | 2115403 A | 9/1983 |
| JP | 2000-086283 A | 3/2000 |
| JP | 2000-211943 A | 8/2000 |
| JP | 2007039281 A | 2/2007 |
| JP | 2007-290899 A | 11/2007 |
| JP | 2010-267965 A | 11/2010 |
| JP | 5026815 B2 | 9/2012 |

OTHER PUBLICATIONS

Borrelli; "Photosensitive Glass and Glass Ceramics"; Chapter 7 "Solarization"; CRC Press, Taylor & Francis Group; 2017.
Ebendorff-Heidepriem et al; "Formation and UV Absorption of Cerium, Europium and Terbium Ions in Different Valencies in Glasses"; Optical Materials, 15, (2000) pp. 7-25.
International Search Report and Written Opinion of the International Searching Authority; PCT/US2017/066931; dated Apr. 16, 2018; 12 Pages; European Patent Office.
Krupa et al; "UV and VUV Optical Excitations in Wide Band Gap Materials Doped With Rare Earth Ions: 4F-5D Transitions"; Journal of Alloys and Compounds, 259 (1997) pp. 287-292.
Qiu et al.; "Preparation and Fluoroescence Properties of Fluoroaluminate Glasses Containing Eu2+ Ions"; Journal of Non-Crystalline Solids; 213&214 (1997) pp. 266-270.
Rygel et al; "Synthesis and Properties of Cerium Aluminosilicophosphate Glasses" Journal of Non-Crystalline Solids; 355 (2009) pp. 2622-2629.
White et al; "Some Studies on the Solarization of Glass "; Journal of the American Ceramic Society; vol. 33, No. 8; pp. 252-257.
W. A. Weyl, "Colored Glasses: V, Fluorescence and Solarization of Glass," J. Soc. Glass Technol., 30 [138] 90-172T (1946).
Chinese Patent Application No. 201780081828.6, Office Action dated May 25, 2021, 12 pages (English Translation Only), Chinese Patent Office.
Japanese Patent Application No. 2019-534958, Office Action dated Sep. 3, 2021, 12 pages (6 pages of English Translation and 6 pages of Original Document), Japanese Patent Office.
Chenggang Zuo et al, "Spectroscopic properties of Ce3+-doped BaO—Gd2O3—Al2O3—B2O3—SiO2 glasses", Journal of Non-Crystalline Solids, vol. 452, Aug. 2016, pp. 35-39.
Chinese Patent Application No. 201780081828.6, Office Action dated Dec. 2021, 17 pages (11 pages of English Translation and 6 pages of Original), Chinese Patent Office.

* cited by examiner

SOLARIZATION RESISTANT RARE EARTH DOPED GLASSES

CROSS-REFERENCE TO RELATED APPLICATIONS

This application is a national stage entry of International Patent Application Serial No. PCT/US2017/066931, filed on Dec. 18, 2017, which in turn, claims the benefit of priority under 35 U.S.C. § 119 of U.S. Provisional Application Ser. No. 62/440,042 filed on Dec. 29, 2016, the contents of each of which are relied upon and incorporated herein by reference in their entireties.

TECHNICAL FIELD

Embodiments of the present disclosure relate to display glass. More particularly, embodiments of the present disclosure relate to display glass for liquid crystal displays.

BACKGROUND

The production of liquid crystal displays, for example, active matrix liquid crystal display devices (AMLCDs) is complex, and the properties of the substrate glass are important. The glass substrates used in the production of liquid crystal display devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors, which ultimately produces brighter and faster displays.

Ultraviolet (UV) exposure and its interaction with glass is generally termed solarization. Solarization of glasses including those finding use in liquid crystal display devices has a negative impact where the glass is involved with UV light, for example from the plasma discharge in sputter deposition units, or when UV curing light is used to cure polymer patterns on glass or use of UV exposure to clean the glass surface.

UV light (e.g., <400 nm) exposure of glass produces an adverse effect in glasses utilized for liquid crystal display devices, e.g., alkali aluminosilicate glasses. The effect manifests itself as an undesirable visible light coloration originating from ubiquitous UV-induced color centers. Another undesirable effect is observed when glass is used as a cover glass for display devices (e.g., OLED) where the active material is UV sensitive. In both examples, it is desirable to have a glass that absorbs light at a wavelength less than about 400 nm to minimize the deleterious effects produced by the UV light. Conventional attempts to add UV light absorbing ions to the glass have been limited by the inability to add sufficient UV absorbing ions to produce adequate UV absorption and yet impart no color to the glass. Accordingly, there is a need in the art for glass compositions having other advantageous properties and characteristics related to solarization.

SUMMARY OF THE CLAIMS

One or more embodiments of the present disclosure are directed to glass comprising in weight percent on an oxide basis in the ranges $SiO_2$ 45-65, $Al_2O_3$ 10-25, $B_2O_3$ 0-5, MgO 0-5, CaO 0-8, SrO 0-5, BaO 0-10, $F^-$ 0 to 15, $Ce_2O_3$>0 to 15, where $Al_2O_3$, MgO, CaO, SrO, BaO represent the weight percents of the respective oxide components. Some embodiments further comprise SnO or $SnO_2$ between 0 to 2 weight percent. Some embodiments further comprise $Eu_2O_3$ between 0 to 5 weight percent. Some embodiments further comprise $Sm_2O_3$ between 0 to 5 weight percent. Some embodiments are alkali-free. Some embodiments further comprise less than 1 weight percent $Na_2O$, $Fe_2O_3$, $SO_3$, $SO_4$, and Ag.

One or more embodiments of the present disclosure are directed to glass comprising in weight percent on an oxide basis in the ranges $SiO_2$ 45-65, $Al_2O_3$ 10-25, $B_2O_3$ 0-5, MgO 0-5, CaO 0-8, SrO 0-5, BaO 0-10, $F^-$>0 to 15, $Ce_2O_3$>0 to 15, where $Al_2O_3$, MgO, CaO, SrO, BaO represent the weight percents of the respective oxide components. Some embodiments further comprise SnO or $SnO_2$ between 0 to 2 weight percent. Some embodiments further comprise $Eu_2O_3$ between 0 to 5 weight percent. Some embodiments further comprise $Sm_2O_3$ between 0 to 5 weight percent. Some embodiments further comprise less than 1 weight percent $Na_2O$, $Fe_2O_3$, $SO_3$, $SO_4$, and Ag.

One or more embodiments of the present disclosure are directed to an alkali-free glass comprising, in weight percent on an oxide basis in the ranges $SiO_2$ 49-62, $Al_2O_3$ 16-20, $B_2O_3$ 1-2, MgO 2-3, CaO 3-5, SrO 1-2, BaO 6-8.5, $F^-$>0 to 10, $Ce_2O_3$>0 to 10, $Sm_2O_3$ 0-2.5, $Eu_2O_3$ 0-2.5, where $Al_2O_3$, MgO, CaO, SrO, BaO represent the weight percents of the respective oxide components. Some embodiments further comprise SnO or $SnO_2$ between 0 to 2 weight percent. Some embodiments further comprise less than 1 weight percent $Na_2O$, $Fe_2O_3$, $SO_3$, $SO_4$, and Ag.

Additional embodiments of the disclosure are directed to an object comprising the glass produced by a downdraw sheet fabrication process. Further embodiments are directed to glass produced by the fusion process or variants thereof.

BRIEF DESCRIPTION OF THE DRAWINGS

The accompanying figures, which are incorporated in and constitute a part of this specification, illustrate several embodiments described below.

DETAILED DESCRIPTION

Described herein are alkali-free glasses and methods for making the same that possess high annealing points and high Young's moduli, allowing the glasses to possess excellent dimensional stability (i.e., low compaction) during the manufacture of TFTs, reducing variability during the TFT process. Glass with high annealing points can help prevent panel distortion due to compaction (e.g., shrinkage) during thermal processing subsequent to manufacturing of the glass. Additionally, some embodiments of the present disclosure have exceptional solarization attributes and high liquidus viscosities, which reduces or eliminates the likelihood of devitrification on the relatively cold forming mandrel. As a result of specific details of their composition, exemplary glasses melt to good quality with very low levels of gaseous inclusions, and with minimal erosion to precious metals, refractories, and tin oxide electrode materials.

In one embodiment, the substantially alkali-free glasses can have high annealing points. In some embodiments, the annealing point is greater than about 785° C., 790° C., 795° C. or 800° C. Without being bound by any particular theory of operation, it is believed that such high annealing points result in low rates of relaxation—and hence comparatively small amounts of compaction—for exemplary glasses to be used as backplane substrate in a low-temperature polysilicon process.

In another embodiment, the temperature of exemplary glasses at a viscosity of about 35,000 poise ($T_{35k}$) is less than or equal to about 1340° C., 1335° C., 1330° C., 1325° C., 1320° C., 1315° C., 1310° C., 1300° C. or 1290° C. In specific embodiments, the glass has a viscosity of about 35,000 poise ($T_{35k}$) less than about 1310° C. In other embodiments, the temperature of exemplary glasses at a viscosity of about 35,000 poise ($T_{35k}$) is less than about 1340° C., 1335° C., 1330° C., 1325° C., 1320° C., 1315° C., 1310° C., 1300° C. or 1290° C. In various embodiments, the glass article has a $T_{35k}$ in the range of about 1275° C. to about 1340° C., or in the range of about 1280° C. to about 1315° C.

The liquidus temperature of a glass ($T_{liq}$) is the temperature above which no crystalline phases can coexist in equilibrium with the glass. In various embodiments, a glass articles has a $T_{liq}$ in the range of about 1180° C. to about 1290° C., or in the range of about 1190° C. to about 1280° C. In another embodiment, the viscosity corresponding to the liquidus temperature of the glass is greater than or equal to about 150,000 poise. In some embodiments, the viscosity corresponding to the liquidus temperature of the glass is greater than or equal to about 175,000 poise, 200,000 poise, 225,000 poise or 250,000 poise.

In another embodiment, an exemplary glass can provide $T_{35k}-T_{liq}>0.25T_{35k}-225°$ C. This ensures minimum tendency to devitrify on the forming mandrel of the fusion process.

In one or more embodiments, the substantially alkali-free glass comprises in weight percent (wt %) on an oxide basis:
SiO₂ 45-65
Al₂O₃ 10-25
B₂O₃ 0-5
MgO 0-5
CaO 0-8
SrO 0-5
BaO 0-10
ZnO 0-5
SnO or SnO₂ 0-2
CeO₂ 0-15
F⁻ 0-15
Sm₂O₃ 0-5
Eu₂O₃ 0-5
where Al₂O₃, MgO, CaO, SrO, BaO, etc. represent the weight percents of the respective oxide components. Such an embodiment can also include negligible or tramp levels of Na₂O, Fe₂O₃, SO₃, SO₄, and Ag.

In some embodiments, the substantially alkali-free glass comprises in weight percent on an oxide basis:
SiO₂ 45-65
Al₂O₃ 10-25
B₂O₃ 1-2
MgO 2-3
CaO 3-5
SrO 1-2
BaO 6-8.5
ZnO 0-5
SnO or SnO₂ 0-2
CeO₂ 0-15
F⁻ 0-15
Sm₂O₃ 0-5
Eu₂O₃ 0-5
where Al₂O₃, MgO, CaO, SrO, BaO, etc. represent the weight percents of the respective oxide components. Such an embodiment can also include negligible or tramp levels of Na₂O, Fe₂O₃, SO₃, SO₄, and Ag.

In certain embodiments, the substantially alkali-free glass comprises in weight percent on an oxide basis:
SiO₂ 49-62
Al₂O₃ 16-20
B₂O₃ 1-2
MgO 2-3
CaO 3-5
SrO 1-2
BaO 6-8.5
ZnO 0-1
SnO or SnO₂ 0-1
CeO₂ 0-10
F⁻ 0-10
Sm₂O₃ 0-2.5
Eu₂O₃ 0-2.5
where Al₂O₃, MgO, CaO, SrO, BaO, etc. represent the weight percents of the respective oxide components. Such an embodiment can also include negligible or tramp levels of Na₂O, Fe₂O₃, SO₃, SO₄, and Ag.

In one embodiment, the glass includes a chemical fining agent. Such fining agents include, but are not limited to, SnO₂, As₂O₃, Sb₂O₃, Cl and Br, and in which the concentrations of the chemical fining agents are kept at a level of 0.5 mol % or less. In some embodiments, the chemical fining agent comprises one or more of SnO₂, As₂O₃, Sb₂O₃, Cl or Br in a concentration less than or equal to about 0.5 mol %, 0.45 mol %, 0.4 mol %, 0.35 mol %, 0.3 mol % or 0.25 mol %. In some embodiments, the glass composition comprises in the range of about 0.01 mol % to about 0.4 mol % of any one or combination of SnO₂, As₂O₃, Sb₂O₃, Cl and/or Br. In some embodiments, As₂O₃ and Sb₂O₃ comprise less than or equal to about 0.005 mol % of the glass composition. In some embodiments, the glass composition comprises in the range of about 0-15 wt % F⁻, 0-10 wt % F⁻, or 0-8 wt % F⁻.

Figure 1:
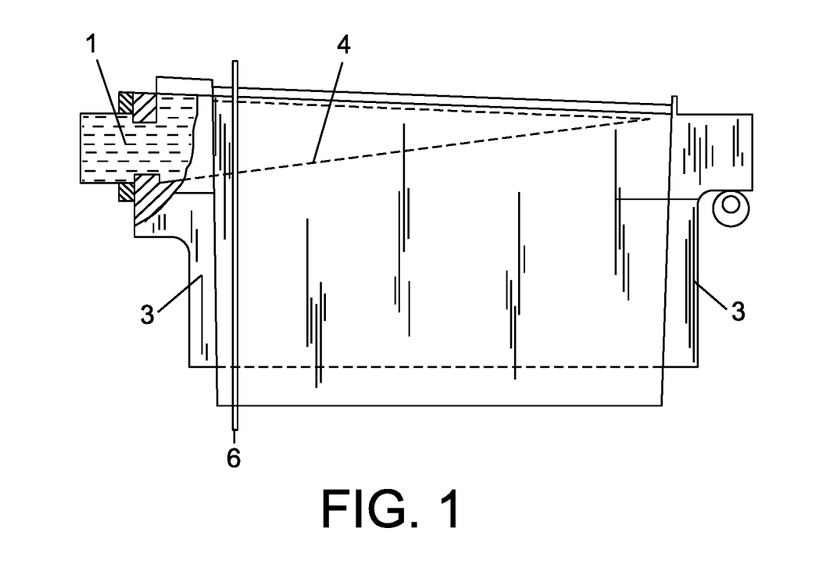
FIG. 1 shows a schematic representation of a forming mandrel used to make precision sheet in the fusion draw process.
Figure 2:
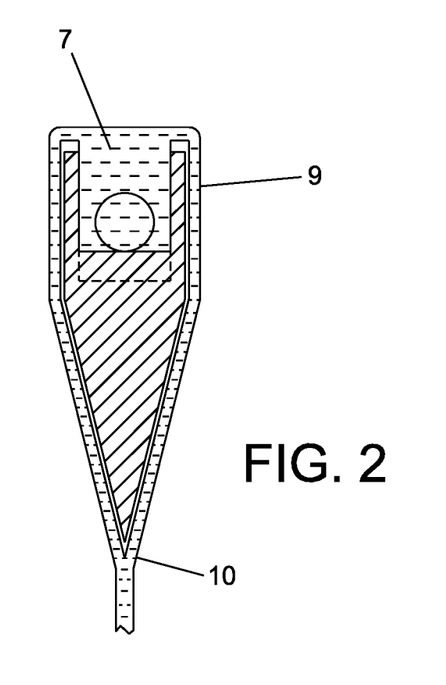
FIG. 2 shows a cross-sectional view of the forming mandrel of FIG. 1 taken along position 6.

In one embodiment, exemplary glasses are manufactured into sheet via the fusion draw process. The fusion draw process may result in a pristine, fire-polished glass surface that reduces surface-mediated distortion to high resolution TFT backplanes and color filters. FIG. 1 is a schematic drawing of a forming mandrel in a non-limiting fusion draw process. FIG. 2 is a schematic cross-section of the forming body near position 6 in FIG. 1. Glass is introduced to the forming body from the inlet 1, flows along the bottom of the trough 4 formed by the trough walls 9 to the compression end 2 of the forming body. Glass overflows the trough walls 9 on either side of the forming body (see FIG. 2), and the two streams of glass join or fuse at the root 10 to form a glass ribbon. Edge directors 3 at either end of the forming body serve to cool the glass and create a thicker strip at the edge called a bead. The glass ribbon is pulled down by pulling rolls that engage with the beads, hence enabling ribbon formation at high viscosity. By adjusting the rate at which ribbon is pulled off the forming body, it is possible to use the fusion draw process to produce a wide range of ribbon thicknesses at a fixed melting rate.

The downdraw glass ribbon drawing processes and, in particular, the fusion draw process described in U.S. Pat. Nos. 3,338,696 and 3,682,609 (both to Dockerty), which are incorporated by reference, can be used herein. Without being bound by any particular theory of operation, it is believed that the fusion draw process can produce glass substrates that do not require polishing. Current glass substrate polishing is capable of producing glass substrates having an average surface roughness (Ra) greater than about 0.5 nm, as measured by atomic force microscopy. The glass substrates produced by the fusion draw process have an average surface roughness as measured by atomic force microscopy of less than 0.5 nm. The substrates also have an average internal stress as measured by optical retardation which is less than or equal to 150 psi. Of course, the claims appended herewith should not be limited to fusion draw processes as embodiments described herein are equally applicable to other forming processes such as, but not limited to, float forming processes.

In one embodiment, exemplary glasses are manufactured into sheet form using the fusion draw process. While exemplary glasses are compatible with the fusion draw process, they may also be manufactured into sheets or other ware through different manufacturing processes. Such processes include slot draw, float, rolling, and other sheet-forming processes known to those skilled in the art.

Relative to these alternative methods for creating sheets of glass, the fusion draw process as discussed above is capable of creating very thin, very flat, very uniform sheets with a pristine surface. Slot draw also can result in a pristine surface, but due to change in orifice shape over time, accumulation of volatile debris at the orifice-glass interface, and the challenge of creating an orifice to deliver truly flat glass, the dimensional uniformity and surface quality of slot-drawn glass are generally inferior to fusion-drawn glass. The float process is capable of delivering very large, uniform sheets, but the surface is substantially compromised by contact with the float bath on one side, and by exposure to condensation products from the float bath on the other side. This means that float glass must be polished for use in high performance display applications.

In embodiments using the fusion draw process, this process may involve rapid cooling of the glass from high temperature, resulting in a high fictive temperature $T_f$. The fictive temperature can be thought of as representing the discrepancy between the structural state of the glass and the state it would assume if fully relaxed at the temperature of interest. Reheating a glass with a glass transition temperature $T_g$ to a process temperature $T_p$ such that $T_p < T_g \leq T_f$ may be affected by the viscosity of the glass. Since $T_p < T_f$, the structural state of the glass is out of equilibrium at $T_p$, and the glass will spontaneously relax toward a structural state that is in equilibrium at $T_p$. The rate of this relaxation scales inversely with the effective viscosity of the glass at $T_p$, such that high viscosity results in a slow rate of relaxation, and a low viscosity results in a fast rate of relaxation. The effective viscosity varies inversely with the fictive temperature of the glass, such that a low fictive temperature results in a high viscosity, and a high fictive temperature results in a comparatively low viscosity. Therefore, the rate of relaxation at $T_p$ scales directly with the fictive temperature of the glass. A process that introduces a high fictive temperature results in a comparatively high rate of relaxation when the glass is reheated at $T_p$.

One means to reduce the rate of relaxation at $T_p$ is to increase the viscosity of the glass at that temperature. The annealing point of a glass represents the temperature at which the glass has a viscosity of $10^{13.2}$ poise. As temperature decreases below the annealing point, the viscosity of the supercooled melt increases. At a fixed temperature below $T_g$, a glass with a higher annealing point has a higher viscosity than a glass with a lower annealing point. Therefore, increasing the annealing point may increase the viscosity of a substrate glass at $T_p$. Generally, the composition changes necessary to increase the annealing point also increase viscosity at all other temperatures. In a non-limiting embodiment, the fictive temperature of a glass made by the fusion process corresponds to a viscosity of about $10^{11}$-$10^{12}$ poise, so an increase in annealing point for a fusion-compatible glass generally increases its fictive temperature as well. For a given glass, higher fictive temperature results in a lower viscosity at temperatures below $T_g$, regardless of the forming process, and thus increasing fictive temperature works against the viscosity increase that would otherwise be obtained by increasing the annealing point. To obtain a substantial change in the rate of relaxation at $T_p$, it is generally necessary to make relatively large changes in the annealing point. An aspect of exemplary glasses is that it has an annealing point greater than or equal to about 750° C., or 785° C., or 790° C., or 795° C. or 800° C., or 805° C., or 810° C., or 815° C. Without being bound by any particular theory of operation, it is believed that such high annealing points result in acceptably low rates of thermal relaxation during low-temperature TFT processing, e.g., typical low-temperature polysilicon rapid thermal anneal cycles.

In addition to its impact on fictive temperature, increasing annealing point also increases temperatures throughout the melting and forming system, particularly the temperatures on the forming body. For example, Eagle XG® glass and Lotus™ glass (Corning Incorporated, Corning, N.Y.) have annealing points that differ by about 50° C., and the temperature at which they are delivered to the forming body also differ by about 50° C. When held for extended periods of time above about 1310° C., zircon refractory forming body shows thermal creep, which can be accelerated by the weight of the forming body itself plus the weight of the glass on the forming body. A second aspect of exemplary glasses described herein is that their delivery temperatures are less than or equal to about 1350° C., or 1345° C., or 1340° C., or 1335° C., or 1330° C., or 1325° C., or 1320° C., or 1315° C. or 1310° C. Such delivery temperatures may permit extended manufacturing campaigns without a need to replace the forming body or extend the time between forming body replacements.

In manufacturing trials of glasses with high annealing points and delivery temperatures below 1350° C. and below 1310° C., it has been found that the glass showed a greater tendency toward devitrification on the root of the forming body and—especially—the edge directors relative to glasses with lower annealing points. Careful measurement of the temperature profile on the forming body showed that the edge director temperatures were much lower relative to the center root temperature than had been anticipated and is believed to be due to radiative heat loss. The edge directors typically are maintained at a temperature below the center root temperature to ensure that the glass is viscous enough as it leaves the root to put the sheet in between the edge directors under tension, thus maintaining a flat shape. As edge directors are located at either end of the forming body, the edge directors are difficult to heat, and thus the temperature difference between the center of the root and the edge directors may differ by 50° C. or more.

While not wishing to be held to theory, it is believed that the increased tendency toward devitrification in the fusion draw process can be understood in terms of the radiative heat loss of glass as a function of temperature. The fusion draw process is substantially an isothermal process, so glass exits the inlet at a particular viscosity and exits the root at a much higher viscosity, but the actual values for the viscosity are not strongly dependent on the identity of the glass or the temperature of the process. Thus, a glass with a higher annealing point generally requires much higher forming body temperatures than a glass with a lower annealing point just to match the delivery and exit viscosities. Again, without being bound by any particular theory of operation, it is believed that since radiative heat loss increases with temperature, and since high annealing point glasses generally are formed at higher temperatures than lower annealing point glasses, the temperature difference between the center root and the edge director generally increases with the annealing point of the glass. This may have a direct relationship to the tendency of a glass to form devitrification products on the forming body or edge directors.

The liquidus temperature of a glass is defined as the highest temperature at which a crystalline phase would appear if a glass were held indefinitely at that temperature. The liquidus viscosity is the viscosity of a glass at the liquidus temperature. To completely avoid devitrification on a fusion forming body, it may be helpful for the liquidus viscosity to be high enough to ensure that glass is no longer on the forming body refractory or edge director material at or near the liquidus temperature.

In practice, few alkali-free glasses have liquidus viscosities of the desired magnitude. Experience with substrate glasses suitable for amorphous silicon applications (e.g., Eagle XG® glass) indicated that edge directors could be held continuously at temperatures up to 60° C. below the liquidus temperature of certain alkali-free glasses. While it was understood that glasses with higher annealing points would require higher forming temperatures, it was not anticipated that the edge directors would be so much cooler relative to the center root temperature. A useful metric for keeping track of this effect is the difference between the delivery temperature onto the forming body and the liquidus temperature of the glass, $T_{liq}$. In the fusion draw process, it is generally desirable to deliver glass at about 35,000 poise ($T_{35k}$). For a particular delivery temperature, it may be useful to make $T_{35k}-T_{liq}$ as large as possible, but for an amorphous silicon substrate such as Eagle XG® glass, it has been found that extended manufacturing campaigns can be conducted if $T_{35k}-T_{liq}$ is about 80° C. or more. As temperature increases, $T_{35k}-T_{liq}$ must increase as well, such that for $T_{35k}$ near 1300° C., it may be helpful to have $T_{35k}-T_{liq}$ equal to or greater than about 100° C. The minimum useful value for $T_{35k}-T_{liq}$ varies approximately linearly with temperature from about 1200° C. to about 1320° C., and can be expressed according to equation (1).

$$\text{Minimum } T_{35k}-T_{liq}=0.25T_{35k}-225, \quad (1)$$

where all temperatures are in ° C. Thus, one or more embodiments of exemplary glasses has a $T_{35k}-T_{liq}>0.25 T_{35k}-225°$ C.

In addition, the forming process may require glass with a high liquidus viscosity. This is necessary to avoid devitrification products at interfaces with the glass and to minimize visible devitrification products in the final glass. Thus, for a given glass compatible with fusion for a particular sheet size and thickness, adjusting the process so as to manufacture wider sheet or thicker sheet generally results in lower temperatures at either end of the forming body. Some embodiments have higher liquidus viscosities to provide greater flexibility for manufacturing via the fusion draw process. In some embodiments, the liquidus viscosity is greater than or equal to about 150 kP.

In tests of the relationship between liquidus viscosity and subsequent devitrification tendencies in the fusion draw process, high delivery temperatures, such as those of exemplary glasses, generally require higher liquidus viscosities for long-term production than would be the case for typical display substrate compositions with lower annealing points. While not wishing to be bound by theory, it is believed that this arises from accelerated rates of crystal growth as temperature increases. The fusion draw process is essentially an isoviscous process, so a more viscous glass at some fixed temperature may be formed by fusion at higher temperature than a less viscous glass. While some degree of undercooling (cooling below the liquidus temperature) can be sustained for extended periods in a glass at lower temperature, crystal growth rates increase with temperature, and thus more viscous glasses grow an equivalent, unacceptable amount of devitrification products in a shorter period of time than less viscous glasses. Depending on where formed, devitrification products can compromise forming stability and introduce visible defects into the final glass.

To be formed by the fusion draw process, one or more embodiments of the glass compositions described herein have a liquidus viscosity greater than or equal to about 100,000 poises, or 150,000 poises, or 175,000 poises, or 200,000 poises. A surprising result is that throughout the range of exemplary glasses, it is possible to obtain a liquidus temperature low enough, and a viscosity high enough, such that the liquidus viscosity of the glass is unusually high compared to other compositions.

In the glass compositions described herein, $SiO_2$ serves as the basic glass former. In certain embodiments, the concentration of $SiO_2$ can be greater than 45 weight percent to provide the glass with a density and chemical durability suitable for a flat panel display glass, and a liquidus temperature (or liquidus viscosity), which allows the glass to be formed by a downdraw process (e.g., a fusion draw process). In terms of an upper limit, in general, the $SiO_2$ concentration can be less than or equal to about 65 weight percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,750° C. In some embodiments, the $SiO_2$ concentration is in the range of about 45.0 wt % to about 65.0 wt %, or in the range of about 47.0 wt % to about 63.0 wt %, or in the range of about 49.0 wt % to about 62 wt %.

$Al_2O_3$ is another glass former used to make the glasses described herein. An $Al_2O_3$ concentration greater than or equal to 10 weight percent provides the glass with a low liquidus temperature and high viscosity, resulting in a high liquidus viscosity. The use of at least 10 weight percent $Al_2O_3$ also improves the glass's annealing point and modulus. In order that the ratio $(MgO+CaO+SrO+BaO)/Al_2O_3$ is greater than or equal to 1.0, the $Al_2O_3$ concentration may be less than about 25 weight percent. In some embodiments, the $Al_2O_3$ concentration is in the range of about 10.0 and 25.0 wt %, or in the range of about 12.0 to about 23 wt %, or in the range of about 14.0 to about 21.0 wt %, or in the range of about 16.0 to about 20.0 wt %. In some embodiments, the $Al_2O_3$ concentration is greater than or equal to about 10.0 wt % while maintaining a ratio of $(MgO+CaO+SrO+BaO)/Al_2O_3$ greater than or equal to about 1.0.

Some embodiments of the disclosure have a modulus greater than about 81 GPa, or greater than about 81.5 GPa, or greater than about 82 GPa, or greater than about 82.5 GPa, or greater than about 83 GPa, or greater than about 83.5 GPa, or greater than about 84 GPa, or greater than about 84.5 GPa or greater than about 85 GPa. In various embodiments, an aluminosilicate glass article has a Young's modulus in the range of about 81 GPa to about 88 GPa, or in the range of about 81.5 GPa to about 85 GPa, or in the range of about 82 GPa to about 84.5 GPa.

The density of some embodiments of aluminosilicate glass articles described herein is less than about 2.7 g/cc, or less than about 2.65 g/cc, or less than about 2.61 g/cc, or less than about 2.6 g/cc, or less than about 2.55 g/cc. In various embodiments, the density is in the range of about 2.55 g/cc to about 2.65 g/cc, or in the range of about 2.57 g/cc to about 2.626 g/cc.

$B_2O_3$ is both a glass former and a flux that aids melting and lowers the melting temperature. It has an impact on both liquidus temperature and viscosity. Increasing $B_2O_3$ can be used to increase the liquidus viscosity of a glass. To achieve these effects, the glass compositions of one or more embodiments may have $B_2O_3$ concentrations that are greater than 0 weight percent. As discussed above with regard to $SiO_2$, glass durability is very important for LCD applications. Durability can be controlled somewhat by elevated concentrations of alkaline earth oxides, and significantly reduced by elevated $B_2O_3$ content. Annealing point decreases as $B_2O_3$ increases, so it may be helpful to keep $B_2O_3$ content low relative to its typical concentration in amorphous silicon substrates. Thus in some embodiments, the glass composition has $B_2O_3$ concentrations that are in the range of about 0.0 and 5.0 weight percent, or greater than 0 to about 3.0 wt %, or about 1.0 to about 2.0 wt %.

The $Al_2O_3$ and $B_2O_3$ concentrations can be selected as a pair to increase annealing point, increase modulus, improve durability, reduce density, and reduce the coefficient of thermal expansion (CTE), while maintaining the melting and forming properties of the glass.

For example, an increase in $B_2O_3$ and a corresponding decrease in $Al_2O_3$ can be helpful in obtaining a lower density and CTE, while an increase in $Al_2O_3$ and a corresponding decrease in $B_2O_3$ can be helpful in increasing annealing point, modulus, and durability, provided that the increase in $Al_2O_3$ does not reduce the $(MgO+CaO+SrO+BaO)/Al_2O_3$ ratio below about 1.0. For $(MgO+CaO+SrO+BaO)/Al_2O_3$ ratios less than about 1.0, it may be difficult or impossible to remove gaseous inclusions from the glass due to late-stage melting of the silica raw material. Furthermore, when $(MgO+CaO+SrO+BaO)/Al_2O_3 \leq 1.05$, mullite, an aluminosilicate crystal, can appear as a liquidus phase. Once mullite is present as a liquidus phase, the composition sensitivity of liquidus increases considerably, and mullite devitrification products both grow very quickly and are very difficult to remove once established. Thus, in some embodiments, the glass composition has $(MgO+CaO+SrO+BaO)/Al_2O_3 \geq 1.0$ (or greater than or equal to about 1.0). In various embodiments, the glass has $(MgO+CaO+SrO+BaO)/Al_2O_3 \geq 1.05$ (or greater than or equal to about 1.05), or in the range of about 1 to about 1.17.

In one or more embodiments, glasses for use in display applications have coefficients of thermal expansion (CTEs) (over the temperature range 22-300° C.) in the range of about $28 \times 10^{-7}$/° C. to about $42 \times 10^{-7}$/° C., or in the range of about $30 \times 10^{-7}$/° C. to about $40 \times 10^{-7}$/° C., or in the range of about $32 \times 10^{-7}$/° C. to about $38 \times 10^{-7}$/° C.

In addition to the glass formers ($SiO_2$, $Al_2O_3$, and $B_2O_3$), the glasses described herein also include alkaline earth oxides. In one embodiment, at least three alkaline earth oxides are part of the glass composition, e.g., MgO, CaO, and BaO, and SrO. The alkaline earth oxides provide the glass with various properties important to melting, fining, forming, and ultimate use. Accordingly, to improve glass performance in these regards, in one embodiment, the $(MgO+CaO+SrO+BaO)/Al_2O_3$ ratio is greater than or equal to about 1.0. As this ratio increases, viscosity tends to increase more strongly than liquidus temperature, and thus it is increasingly difficult to obtain suitably high values for $T_{35k}-T_{liq}$. Thus in another embodiment, ratio $(MgO+CaO+SrO+BaO)/Al_2O_3$ is less than or equal to about 2. In some embodiments, the $(MgO+CaO+SrO+BaO)/Al_2O_3$ ratio is in the range of about 1 to about 1.2, or in the range of about 1 to about 1.16, or in the range of about 1.1 to about 1.6. In detailed embodiments, the $(MgO+CaO+SrO+BaO)/Al_2O_3$ ratio less than about 1.7, or 1.6, or 1.5.

For certain embodiments of this disclosure, the alkaline earth oxides may be treated as what is in effect a single compositional component. This is because their impact upon viscoelastic properties, liquidus temperatures and liquidus phase relationships are qualitatively more similar to one another than they are to the glass forming oxides $SiO_2$, $Al_2O_3$ and $B_2O_3$. However, the alkaline earth oxides CaO, SrO and BaO can form feldspar minerals, notably anorthite ($CaAl_2Si_2O_8$) and celsian ($BaAl_2Si_2O_8$) and strontium-bearing solid solutions of same, but MgO does not participate in these crystals to a significant degree. Therefore, when a feldspar crystal is already in the liquidus phase, a super addition of MgO may serve to stabilize the liquid relative to the crystal and thus lower the liquidus temperature. At the same time, the viscosity curve typically becomes steeper, reducing melting temperatures while having little or no impact on low-temperature viscosities.

Small amounts of MgO may benefit melting by reducing melting temperatures, and forming by reducing liquidus temperatures and increasing liquidus viscosity, while preserving a high annealing point and, thus, low compaction. In various embodiments, the glass composition comprises MgO in an amount in the range of about 0.0 to about 5 wt %, or in the range of about 1.0 wt % to about 4.0 wt %, or in the range of about 1.0 wt % to about 3.0 wt %, or in the range of about 1.0 wt % to about 2.0 wt %.

Glasses with suitably high values of $T_{35k}-T_{liq}$, the ratio of MgO to the other alkaline earths, $MgO/(MgO+CaO+SrO+BaO)$, falls within a relatively narrow range. As noted above, additions of MgO can destabilize feldspar minerals, and thus stabilize the liquid and lower liquidus temperature. However, once MgO reaches a certain level, mullite, $Al_6Si_2O_{13}$, may be stabilized, thus increasing the liquidus temperature and reducing the liquidus viscosity. Moreover, higher concentrations of MgO tend to decrease the viscosity of the liquid, and thus even if the liquidus viscosity remains unchanged by addition of MgO, it will eventually be the case that the liquidus viscosity will decrease. Thus in another embodiment, 0.20≤MgO/(MgO+CaO+SrO+BaO)≤0.40 or in some embodiments, 0.22≤MgO/(MgO+CaO+SrO+BaO) ≤0.37. Within these ranges, MgO may be varied relative to the glass formers and the other alkaline earth oxides to maximize the value of $T_{35k}-T_{liq}$ consistent with obtaining other desired properties.

Without being bound by any particular theory of operation, it is believed that calcium oxide (CaO) present in the glass composition can produce low liquidus temperatures (high liquidus viscosities), high annealing points and moduli, and CTE's in the most desired ranges for flat panel applications. The presence of calcium oxide also contributes favorably to chemical durability, and compared to other alkaline earth oxides, it is relatively inexpensive as a batch material. However, at high concentrations, CaO increases the density and CTE. Furthermore, at sufficiently low $SiO_2$ concentrations, CaO may stabilize anorthite, thus decreasing liquidus viscosity. Accordingly, in one or more embodiments, the CaO concentration can be greater than or equal to 3 weight percent. In various embodiments, the CaO concentration of the glass composition is in the range of about 0.0 wt % to about 8.0 wt %, or in the range of about 1.0 wt % to about 7.0 w t %, or in the range of about 2.0 wt % to about 6.0 wt %, or in the range of about 3.0 wt % to about 5.0 wt %.

SrO and BaO can both contribute to low liquidus temperatures (high liquidus viscosities) and, thus, the glasses described herein will typically contain at least both of these oxides. However, the selection and concentration of these oxides are selected to avoid an increase in CTE and density and a decrease in modulus and annealing point. The relative proportions of SrO and BaO can be balanced so as to obtain a suitable combination of physical properties and liquidus viscosity such that the glass can be formed by a downdraw process. In various embodiments, the glass comprises SrO in the range of about 0 to about 5.0 wt %, or greater than 0 to about 4.0 wt %, or about 0 to about 3.0 wt %, or in the range of about 1.0 wt % to about 2.0 wt %. In one or more embodiments, the glass comprises BaO in the range of about 0 to about 10.0 wt %, or greater than 0 to about 10.0 wt %, or about 2.0 to about 9.0 wt %, or about 3.0 wt % to about 8.5 wt %, or about 4.0 wt % to about 8.5 wt %, or about 6.0 wt % to about 8.5 wt %.

To summarize the roles and effects of the central components of the glasses of the disclosure, $SiO_2$ is the basic glass former. $Al_2O_3$ and $B_2O_3$ are also glass formers and can be selected as a pair with, for example, an increase in $B_2O_3$ and a corresponding decrease in $Al_2O_3$ can used to obtain a lower density and CTE, while an increase in $Al_2O_3$ and a corresponding decrease in $B_2O_3$ can be used in increasing annealing point, modulus, and durability, provided that the increase in $Al_2O_3$ does not reduce the $RO/Al_2O_3$ ratio below about 1.0, where RO=(MgO+CaO+SrO+BaO). If the ratio goes too low, meltability is compromised, i.e., the melting temperature becomes too high. $B_2O_3$ can be used to bring the melting temperature down, but high levels of $B_2O_3$ compromise annealing point.

In addition to meltability and annealing point considerations, for display applications, the CTE of the glass should be compatible with that of silicon. To achieve such CTE values, exemplary glasses can control the RO content of the glass. For a given $Al_2O_3$ content, controlling the RO content corresponds to controlling the $RO/Al_2O_3$ ratio. In practice, glasses having CTE's suitable for display applications can be produced if the $RO/Al_2O_3$ ratio is below about 1.6.

In addition to the above components, the glass compositions described herein can include various other oxides to adjust various physical, melting, fining, and forming attributes of the glasses. Examples of such other oxides include, but are not limited to, $TiO_2$, MnO, $Fe_2O_3$, ZnO, $Nb_2O_5$, $MoO_3$, $Ta_2O_5$, $WO_3$, $Y_2O_3$, $La_2O_3$, $Sm_2O_3$, $Eu_2O_3$, and $CeO_2$ as well as other rare earth oxides and phosphates. In some embodiments, the glass composition comprises ZnO in an amount in the range of about 0 to about 5 wt %, or about 0 to about 1.0 wt %. The glass compositions described herein can also include various contaminants associated with batch materials and/or introduced into the glass by the melting, fining, and/or forming equipment used to produce the glass, particularly $Fe_2O_2$ and $ZrO_2$. The glasses can also contain $SnO_2$ either as a result of Joule melting using tin-oxide electrodes and/or through the batching of tin containing materials, e.g., $SnO_2$, SnO, $SnCO_3$, $SnC_2O_2$, etc.

As is known in the industry, UV radiation can cause irreversible damage to organic materials and human tissues. UV B (wavelengths within the range 280-320 nm) are the most energetic, that often results in short term effects (e.g., sunburns); however, UV A (320-390 nm) can cause cumulative damage to the same tissues and materials. Thus, there is a need in some embodiments to remove the UV spectrum from interaction with biological tissues and material (e.g., in a vial or in an interaction with OLED layers or UV curable polymers on glass in a device). In such applications, a filtering system can be incorporated into the material (glass) rather than using an additive process to fabricate a film.

Further, it has been discovered that UV radiation having wavelengths <400 nm can produce an adverse effect in alkali aluminosilicate glasses commonly employed in display applications. This adverse effect manifests itself as an undesirable visible light coloration originating from ubiquitous UV-induced color centers. Another undesirable effect is observed when glass is used as a cover glass for display devices where the active device or material (OLED, quantum dots) is UV sensitive. In both examples it would be advantageous to have a glass that absorbs light at wavelengths <400 nm to minimize the deleterious effects produced by the UV light.

Conventional attempts to add ions to the glass that absorb UV light have been limited by the amount of such UV absorbing ions that can be added sufficient to produce adequate UV absorption and yet impart no color to the glass. This correlation is a consequence of the relationship between the strength of the absorption and the extent of the wavelength tail of absorption band. Thus, exemplary embodiments can incorporate fluorine along with the $Ce^{+3}$ in aluminosilicate glasses to give rise to a sharper absorption attributed to the formation fluoride ligands of the Ce. Sharpness is defined as slope of the absorption vs. wavelength in the absorption curve in units of optical density/mm/nm. Absorption cutoff is defined as when the absorbance OD/mm= or >2. This allows a higher $Ce^{+3}$ concentration to be achieved without any adverse coloration effect. This higher $Ce^{+3}$ concentration provide more UV protection. In further embodiments, it was also discovered that $Eu^{+2}$ can be formed in such glasses and can move an absorption cut off closer to 400 nm.

For illustrative purposes, transition metals, rare earths, and actinides form stable compounds with partially filled electronic shells. These partially filled shells of d or f electrons give rise to spectrally narrow electronic transitions that occur at wavelengths ranging from the far infrared to ultraviolet. Rare-earth ions are different from other transitional elements since their 4f electrons remain highly localized on the ion and maintain this atomic-like character when the ion is incorporated into a solid. This behavior is in sharp contrast to the transition metals' d electrons, whose behavior is strongly affected by the local environment. Atomic-like characteristics of the rare-earth ions is because the lowest-energy electrons are not spatially the outermost electrons of the ion and therefore have a limited interaction with the ion's environment. This causes a "shielding" effect for the 4f electrons, preventing them from directly participating in bonding and allowing them to maintain much of the character exhibited by a free ion.

Oxide glasses have been shown to be useful as host materials for rare-earth elements because of their high transparency, compositional variety and easy mass production. When melted by conventional techniques, most glasses incorporate rare-earth ions (if present) as the trivalent ion. To reduce the rare earth, it becomes necessary to melt the glass under a strong reducing atmosphere (e.g., Ar and C crucibles). When included in a glass matrix, cerium and europium ions can have two valencies that affect the absorption properties of these ions. The electron donation ability of lower valent ions ($Ce^{3+}$, $Eu^{2+}$) facilitates excitation of electrons from the 4f to 5d shell. The electron acceptor ability of the higher valent ions ($Ce^{4+}$, $Eu^{3+}$) facilitates the charge transfer from ligands to rare earth ions. As a result, both 4f-5d and charge transfer (CT) transitions are shifted to lower energy, and UV range with 4f-5d transitions have moderate bandwidths and CT with broad bands. Since both 4f-5d and CT transitions are electronic allowed they have high extinction coefficients.

It is known that absorption peaks due to 4f-5d transitions for $Ce^{3+}$ are at 294-320 nm and for $Eu^{2+}$ at 317-344 nm. It is also known that CT bands for $Ce^{4+}$ are at 240-250 nm and for $Eu^{3+}$ at 213 nm. These rare earth metal ions' ability to absorb UV radiation has led to applications where UV blocking is desired, such as eye glasses for eye protection (e.g., $Ce^{3+}$) and solarization prevention in silicates (e.g., $Ce^{3+}$). To be effective at UV blocking, high cerium content is required, which historically has led to a strong yellow color. In applications of solarization resistant cerium doped silicates, it may become necessary to maintain high optical transparency at visible wavelengths, which has limited the concentration of cerium in the glass. Thus, most alkali borosilicate glasses can use 1-2 mol % $CeO_2$ without color.

Some exemplary embodiments are aluminoborosilicate glasses comprising cerium, europium and/or fluorine. Such embodiments can be alkali-free. As discussed below, exemplary aluminoborosilicate glasses were prepared to evaluate the effect on the strength of the absorption and the extent of the wavelength tail of absorption band. Absorption sharpness is defined as slope of the absorption vs. wavelength in the absorption curve in units of optical density/mm/nm (typically using wavelengths corresponding to Absorbance 2 and 0.5 OD/mm). Absorption cut off (edge) is defined as when the absorbance OD/mm≥2. OD is optical density.

Figure 3:
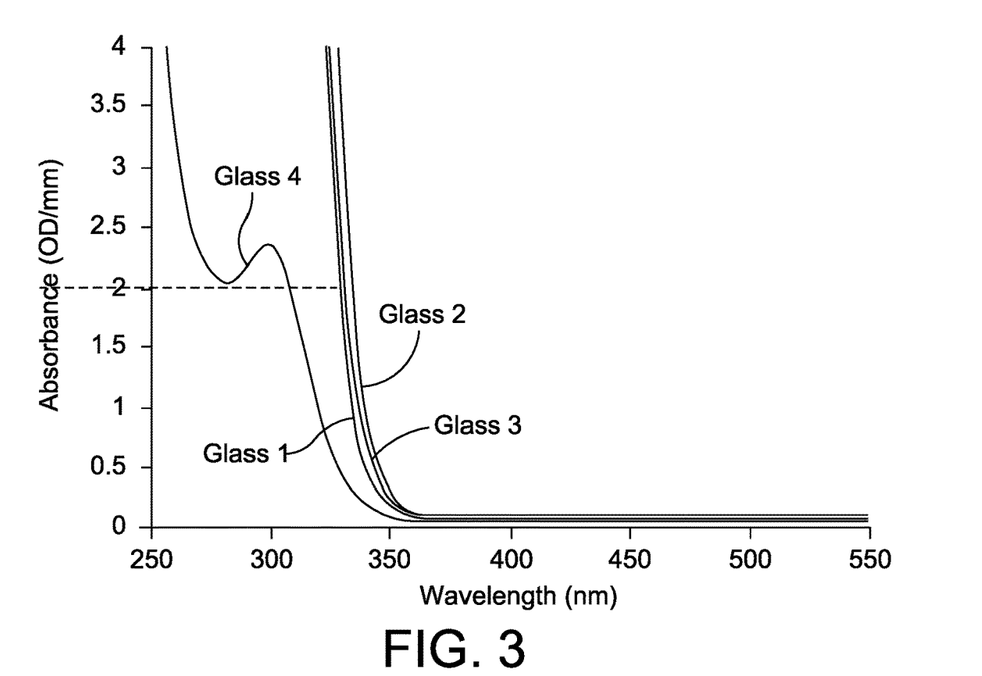
FIG. 3 is a graphical illustration showing the effect of increasing $CeO_2$ wt % in some embodiments.

With reference to FIG. 3, absorbance as a function of wavelength data can be observed. For example, FIG. 3, illustrates that the combination of a high concentration of $Ce^{+3}$ and the incorporation of fluorine can produce a sharp UV absorption cut off into an aluminoborosilicate glass. Sharpness can be defined as slope of the absorption vs. wavelength in the absorption curve in units of optical density/mm/nm. Absorption cutoff can be defined as when the absorbance/mm equals or is greater than 2. With reference to FIG. 3, it can be observed that one can incorporate much higher concentrations of cerium as $Ce^{+3}$ (e.g., greater than 4.6 mol % or a corresponding wt %) and not have any undesirable absorption leakage into the visible spectrum. FIG. 3 also illustrates the effect of increasing $CeO_2$ mol % in alkali free oxide glasses.

Figure 4:
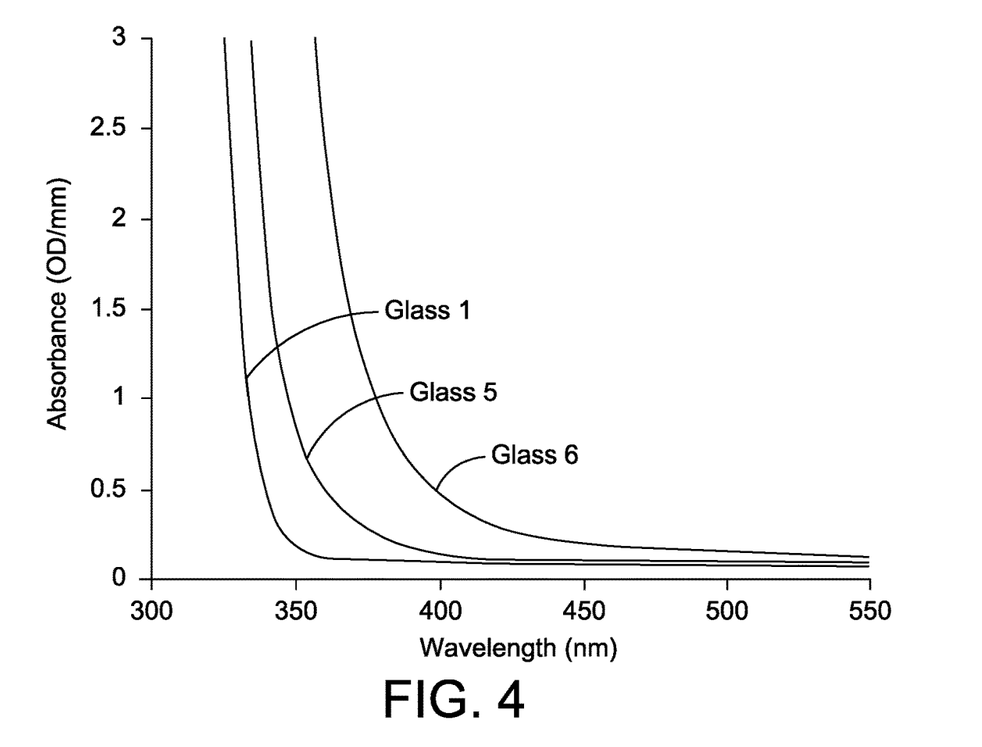
FIG. 4 is a graphical illustration showing the effect of $F^-$ wt % in the glass with high $CeO_2$ content in some embodiments.

With reference to FIG. 4, an absorption spectrum is illustrated which compares the absorption edge with and without fluorine in a Ce-containing aluminoborosilicate glass. FIG. 4 also illustrates the effect of $F^-$ mol % in the glass with high $CeO_2$ content in alkali free oxide glass whereby the absorption edge or cut off can be moved or controlled moves from 330 nm, to 340 nm, to 365 nm.

In these exemplary glasses, fluoride ion content was varied while keeping a high ceria loading, and the absorption cut off moved from 330 nm for Glass 1 to 365 nm for Glass 6 (at an absorbance 2 OD/mm). It was also observed that the $Ce^{+3}$ ligands are now surrounded by F, not oxygen, which accounts for a steeper absorption edge. For example sharpness parameter changed from 0.07 to 0.25 OD/mm/nm depending on the composition. It should be noted that if no fluorine was present, the glass would have been yellow and would lack usefulness in display applications due to absorption in the 400-440 nm region.

Figure 5:
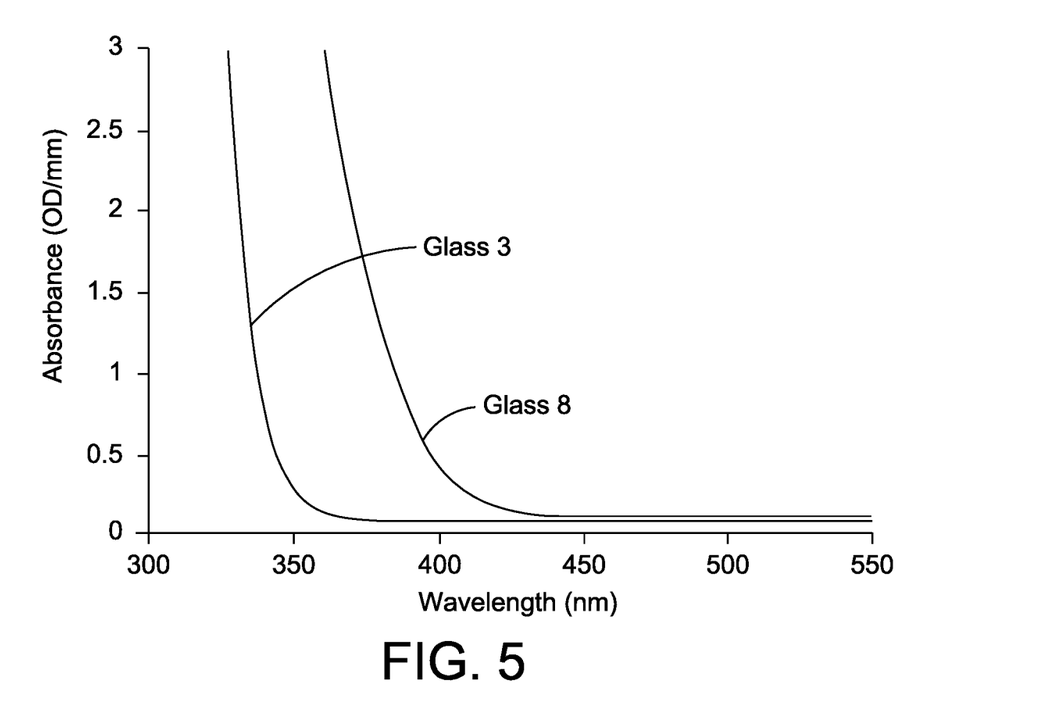
FIG. 5 is a graphical illustration showing the effect of $Eu^{2+}$ in some embodiments.

With reference to FIG. 5, an absorption spectrum is illustrated which compares the absorption edge with fluorine and europium. FIG. 5 also illustrates the effect of $Eu^{2+}$ in alkali free oxide glasses and the control of absorption edge or cut off from 330 nm to 370 nm. For example and with continued reference to FIG. 5, it can be observed that the addition of europium oxide moved the absorption cut off to 370 nm (at 2 OD/mm) indicating $Eu^{2+}$ in the matrix (e.g., 4f-5d transitions are $Eu^{2+}$ 317-344 nm, $Eu^{3+}$ 213 nm). It can also be observed that sharpness parameters are reduced for this composition ~0.07 OD/mm/nm.

Figure 6:
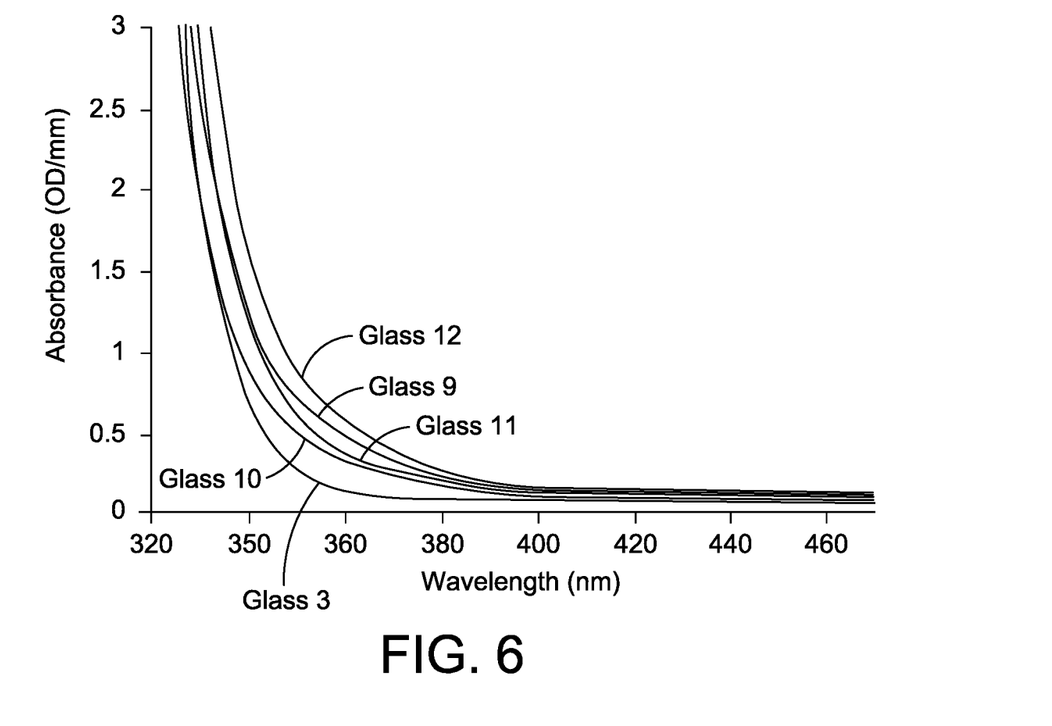
FIG. 6 is a graphical illustration showing the effect of $Ce^{3+}$ and $Eu^{2+}$ in some embodiments.

With reference to FIG. 6, an absorption spectrum is illustrated showing that the absorption cut off can be moved further into the visible by having both $Ce^{3+}$ and $Eu^{3+}$ in a glass matrix. FIG. 6 also illustrates the effect of combining $Eu^{2+}$ and $Ce^{3+}$ in alkali free oxide glasses and the control of absorption edge or cut off from 330 nm to 370 nm. In these exemplary glasses, ceria concentration was maintained between 2.02 and 2.05 wt % but the europium oxide concentration was varied from 0-1.0282 wt %. As expected, the absorption cut off moves (given at Abs=2 OD/mm) from 330 nm for Glass 3 (2.0567 wt % Ce, 0 mol % Eu), to 335 nm for Glass 9 (2.0408 wt % Ce, 0.2498 wt % Eu), to 340 nm for Glass 12 (2.0403 wt % Ce, 1.0282 wt % Eu). Thus, some exemplary embodiments can include between 0 to 15 wt % $CeO_2$, between 0 to 14 wt % $CeO_2$, between 0 to 13 wt % $CeO_2$, between 0 to 12 wt % $CeO_2$, between 0 to 11 wt % $CeO_2$, or between 0 to 10 wt % $CeO_2$, and/or between 0 to 5 wt % $Eu_2O_3$, between 0 to 4 wt % $Eu_2O_3$, between 0 to 3 wt % $Eu_2O_3$, or between 0 to 2.5 wt % $Eu_2O_3$.

Glass compositions disclosed herein are generally alkali free; however, the glasses can contain some alkali contaminants. In the case of display applications, it is desirable to keep the alkali levels below 0.1 mole or weight percent (e.g., "tramp" levels) to avoid having a negative impact on thin film transistor (TFT) performance through diffusion of alkali ions from the glass into the silicon of the TFT. As used herein, an "alkali-free glass" is a glass having a total alkali concentration which is less than or equal to 0.1 mole percent or less than or equal to 0.1 weight percent, where the total alkali concentration is the sum of the $Na_2O$, $K_2O$, and $Li_2O$ concentrations. In one embodiment, the total alkali concentration is less than or equal to 0.1 mole percent or less than or equal to 0.1 weight percent.

$As_2O_3$ is an effective high temperature fining agent for display glasses, and in some embodiments described herein, $As_2O_3$ is used for fining because of its superior fining properties. However, $As_2O_3$ is poisonous and requires special handling during the glass manufacturing process. Accordingly, in certain embodiments, fining is performed without the use of substantial amounts of $As_2O_3$, i.e., the finished glass has at most 0.05 mole percent $As_2O_3$. In one embodiment, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain embodiments, fining is performed without the use of substantial amounts of $Sb_2O_3$, i.e., the finished glass has at most 0.05 mole percent $Sb_2O_3$. In another embodiment, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of display glasses through the use of tin oxide electrodes in the Joule melting of the batch materials for such glasses. The presence of $SnO_2$ in display glasses has not resulted in any known adverse effects in the use of these glasses in the manufacture of liquid crystal displays. However, high concentrations of $SnO_2$ are not preferred as this can result in the formation of crystalline defects in display glasses. In some embodiments, the concentration of $SnO_2$ in the finished glass is less than or equal to 2 weight percent, or between 0 to 1 weight percent.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain embodiments, maintaining the $(MgO+CaO+SrO+BaO)/Al_2O_3$ ratio and individual alkaline earth concentrations within the ranges discussed above makes the fining process easier to perform and more effective.

U.S. Pat. No. 5,785,726 (Dorfeld et al.), U.S. Pat. No. 6,128,924 (Bange et al.), U.S. Pat. No. 5,824,127 (Bange et al.), and U.S. Pat. Nos. 7,628,038 and 7,628,039 (De Angelis, et al.) disclose processes for manufacturing arsenic free glasses. U.S. Pat. No. 7,696,113 (Ellison) discloses a process for manufacturing arsenic- and antimony-free glass using iron and tin to minimize gaseous inclusions.

According to some embodiments, a population of 50 sequential glass sheets produced by the downdraw process from the melted and fined batch materials has an average gaseous inclusion level of less than 0.05 gaseous inclusions/cubic centimeter, where each sheet in the population has a volume of at least 500 cubic centimeters.

One or more embodiments of the present disclosure are directed to glass comprising in weight percent on an oxide basis in the ranges $SiO_2$ 45-65, $Al_2O_3$ 10-25, $B_2O_3$ 0-5, MgO 0-5, CaO 0-8, SrO 0-5, BaO 0-10, $F^-$ 0 to 15, $Ce_2O_3$>0 to 15, where $Al_2O_3$, MgO, CaO, SrO, BaO represent the weight percents of the respective oxide components. Some embodiments further comprise SnO or $SnO_2$ between 0 to 2 weight percent. Some embodiments further comprise $Eu_2O_3$ between 0 to 5 weight percent. Some embodiments further comprise $Sm_2O_3$ between 0 to 5 weight percent. Some embodiments are alkali-free. Some embodiments further comprise less than 1 weight percent $Na_2O$, $Fe_2O_3$, $SO_3$, $SO_4$, and Ag.

One or more embodiments of the present disclosure are directed to glass comprising in weight percent on an oxide basis in the ranges $SiO_2$ 45-65, $Al_2O_3$ 10-25, $B_2O_3$ 0-5. MgO 0-5, CaO 0-8. SrO 0-5, BaO 0-10, $F^-$>0 to 15, $Ce_2O_3$>0 to 15, where $Al_2O_3$, MgO, CaO, SrO, BaO represent the weight percents of the respective oxide components. Some embodiments further comprise SnO or $SnO_2$ between 0 to 2 weight percent. Some embodiments further comprise $Eu_2O_3$ between 0 to 5 weight percent. Some embodiments further comprise $Sm_2O_3$ between 0 to 5 weight percent. Some embodiments further comprise less than 1 weight percent $Na_2O$, $Fe_2O_3$, $SO_3$, $SO_4$, and Ag.

One or more embodiments of the present disclosure are directed to an alkali-free glass comprising, in weight percent on an oxide basis in the ranges $SiO_2$ 49-62, $Al_2O_3$ 16-20, $B_2O_3$ 1-2, MgO 2-3, CaO 3-5, SrO 1-2, BaO 6-8.5, $F^-$>0 to 10, $Ce_2O_3$>0 to 10, $Sm_2O_3$ 0-2.5, $Eu_2O_3$ 0-2.5, where $Al_2O_3$, MgO, CaO, SrO, BaO represent the weight percents of the respective oxide components. Some embodiments further comprise SnO or $SnO_2$ between 0 to 2 weight percent. Some embodiments further comprise less than 1 weight percent $Na_2O$, $Fe_2O_3$, $SO_3$, $SO_4$, and Ag.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. Moreover, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

Examples

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Exemplary glasses are shown in Tables 1 and 2.

The exemplary glasses of Tables 1 and 2 were prepared using a commercial sand as a silica source, milled such that 90% by weight passed through a standard U.S. 100 mesh sieve. Alumina was the alumina source, periclase was the source for MgO, limestone the source for CaO, strontium carbonate, strontium nitrate or a mix thereof was the source for SrO, barium carbonate was the source for BaO, and tin (IV) oxide was the source for $SnO_2$. The raw materials were thoroughly mixed, loaded into a platinum vessel suspended in a furnace heated by silicon carbide glowbars. The raw materials were then melted and stirred for several hours at temperatures between 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of Tables 1 and 2 can be prepared using standard methods well-known to those skilled in the art. Such methods include a continuous melting process, wherein the melter used in the continuous melting process is heated by gas, by electric power, or combinations thereof.

Raw materials appropriate for producing exemplary glasses include commercially available sands as sources for $SiO_7$; alumina, aluminum hydroxide, hydrated forms of alumina, and various aluminosilicates, nitrates and halides as sources for $Al_2O_3$; boric acid, anhydrous boric acid and boric oxide as sources for $B_2O_3$; periclase, dolomite (also a source of CaO), magnesia, magnesium carbonate, magnesium hydroxide, and various forms of magnesium silicates, aluminosilicates, nitrates and halides as sources for MgO; limestone, aragonite, dolomite (also a source of MgO), wollastonite, and various forms of calcium silicates, aluminosilicates, nitrates and halides as sources for CaO; and oxides, carbonates, nitrates and halides of strontium and barium. If a chemical fining agent is desired, tin can be added as $SnO_2$, as a mixed oxide with another major glass component (e.g., $CaSnO_3$), or in oxidizing conditions as SnO, tin oxalate, tin halide, or other compounds of tin known to those skilled in the art.

The glasses in Tables 1 and 2 contain $SnO_2$ as a fining agent, but other chemical fining agents could also be employed to obtain glass of sufficient quality for TFT substrate applications. For example, exemplary glasses could employ any one or combinations of $As_2O_3$, $Sb_2O_3$, $CeO_2$, $Fe_2O_3$, and halides as deliberate additions to facilitate fining, and any of these could be used in conjunction with the $SnO_2$ chemical fining agent shown in the examples. Of these, $As_2O_3$ and $Sb_2O_3$ are generally recognized as hazardous materials, subject to control in waste streams such as might be generated in the course of glass manufacture or in the processing of TFT panels. It is therefore desirable to limit the concentration of $As_2O_3$ and $Sb_2O_3$ individually or in combination to no more than 0.005 mol %.

In addition to the elements deliberately incorporated into exemplary glasses, nearly all stable elements in the periodic table are present in glasses at some level, either through low levels of contamination in the raw materials, through high-temperature erosion of refractory materials and precious metals in the manufacturing process, or through deliberate introduction at low levels to fine tune the attributes of the final glass. For example, zirconium may be introduced as a contaminant via interaction with zirconium-rich refractory materials. As a further example, platinum and rhodium may be introduced via interactions with precious metal components of the glass making apparatus. As a further example, iron may be introduced as a tramp in raw materials, or deliberately added to enhance control of gaseous inclusions. As a further example, manganese may be introduced to control color or to enhance control of gaseous inclusions. As a further example, alkalis may be present as a tramp component at levels up to about 0.1 mol % or 1.0 weight percent for the combined concentration of $Li_2O$, $Na_2O$ and $K_2O$.

Hydrogen is inevitably present in the form of the hydroxyl anion, $OH^-$, and its presence can be ascertained via standard infrared spectroscopy techniques. Dissolved hydroxyl ions significantly and nonlinearly impact the annealing point of exemplary glasses, and thus to obtain the desired annealing point it may be necessary to adjust the concentrations of major oxide components to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion of natural gas and related hydrocarbons, and thus it may be desirable to shift the energy used in melting from burners to electrodes to compensate. Alternatively, one might instead employ an iterative process of adjusting major oxide components of the glass to compensate for the deleterious impact of dissolved hydroxyl ions.

Sulfur is often present in natural gas, and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO_4^-$) or sulfite dissolved in the glass. The elevated barium concentrations of exemplary glasses appear to increase sulfur retention in the glass in early stages of melting, but as noted above, barium is required to obtain a low liquidus temperature, and hence high $T_{35k}-T_{liq}$ and high liquidus viscosity. Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials (e.g., tramp levels).

Reduced multivalents can also be used to control the tendency of exemplary glasses to form $SO_2$ blisters. While not wishing to be bound to theory, these elements behave as potential electron donors that suppress the electromotive force for sulfate reduction. Sulfate reduction can be written in terms of a half reaction such as $$SO_4^= \rightarrow SO_2 + O_2 + 2e^-$$

where $e^-$ denotes an electron. The "equilibrium constant" for the half reaction is $$K_{eq} = [SO_2][O_2][e^-]^2/[SO_4^=]$$

where the brackets denote chemical activities. Ideally one would like to force the reaction to create sulfate from $SO_2$, $O_2$ and $2e^-$. Adding nitrates, peroxides, or other oxygen-rich raw materials may help, but also may work against sulfate reduction in the early stages of melting, which may counteract the benefits of adding them in the first place. $SO_2$ has very low solubility in most glasses, and so is impractical to add to the glass melting process. Electrons may be "added" through reduced multivalents. For example, an appropriate electron-donating half reaction for ferrous iron ($Fe^{2+}$) is expressed as $$2Fe^{2+} \rightarrow 2Fe^{3+} + 2e^-$$

This "activity" of electrons can force the sulfate reduction reaction to the left, stabilizing $SO_4$ in the glass. Suitable reduced multivalents include, but are not limited to, $Fe^{2+}$, $Mn^{2+}$, $Sn^{2+}$, $Sb^{3+}$, $As^{3+}$, $V^{3+}$, $Ti^{3+}$, and others familiar to those skilled in the art. In each case, it may be important to minimize the concentrations of such components to avoid deleterious impact on the color of the glass, or in the case of As and Sb, to avoid adding such components at a high enough level to minimize complications of waste management in an end-user's process.

In addition to the major oxides components of exemplary glasses, and the minor or tramp constituents noted above, halides may be present at various levels, either as contaminants introduced through the choice of raw materials, or as deliberate components used to eliminate gaseous inclusions in the glass.

In addition to these major oxide components, minor and tramp components, multivalents and halide fining agents, it may be useful to incorporate low concentrations of other colorless oxide components to achieve desired physical, optical or viscoelastic properties. Such oxides include, but are not limited to, $TiO_2$, $ZrO_2$, $HfO_2$, $Nb_2O_5$, $Ta_2O_5$, $MoO_3$, $WO_3$, $ZnO$, $In_2O_3$, $Ga_2O_3$, $Bi_2O_3$, $GeO_2$, $PhO$, $SeO_3$, $TeO_2$, $Y_2O_3$, $La_2O_3$, $Gd_2O_3$, and others known to those skilled in the art. Through an iterative process of adjusting the relative proportions of the major oxide components of exemplary glasses, such colorless oxides can be added to a level of up to about 2 mol % without unacceptable impact to annealing point, $T_{35k}-T_{liq}$ or liquidus viscosity.

Table 1 shows examples of glasses in mol % (samples 1-18) described above and with reference to FIGS. 1-6, each example comprising a super addition of F−, $CeO_2$, $Sm_2O_3$, and/or $Eu_2O_3$. Table 2 lists each of these samples normalized to 100 weight percent and measured in wt %.

TABLE 1

| | Sample | | | | | | | |
|---|---|---|---|---|---|---|---|---|
| | 1 | 2 | 3 | 4 | 5 | 6 | 7 | 8 |
| $SiO_2$ | 70.24 | 70.24 | 70.24 | 70.24 | 70.24 | 70.24 | 70.24 | 70.24 |
| $Al_2O_3$ | 13.29 | 13.29 | 13.29 | 13.29 | 13.29 | 13.29 | 13.29 | 13.29 |
| $B_2O_3$ | 1.68 | 1.68 | 1.68 | 1.68 | 1.68 | 1.68 | 1.68 | 1.68 |
| MgO | 4.32 | 4.32 | 4.32 | 4.32 | 4.32 | 4.32 | 4.32 | 4.32 |
| CaO | 5.57 | 5.57 | 5.57 | 5.57 | 5.57 | 5.57 | 5.57 | 5.57 |
| SrO | 1.19 | 1.19 | 1.19 | 1.19 | 1.19 | 1.19 | 1.19 | 1.19 |
| BaO | 3.61 | 3.61 | 3.61 | 3.61 | 3.61 | 3.61 | 3.61 | 3.61 |
| ZnO | 0 | 0 | 0 | 0 | 0 | 0 | 0 | 0 |
| SnO | 0.26 | 0.26 | 0.26 | 0.26 | 0.26 | 0.26 | 0.26 | 0.26 |
| F− | 42.605 | 11.5 | 3.83 | 0.38 | 19.2 | 0 | 4.26 | 1.9 |
| $CeO_2$ | 4.26 | 2.6 | 0.86 | 0.086 | 4.3 | 4.3 | 0 | 0 |
| $Sm_2O_3$ | 0 | 0 | 0 | 0 | 0 | 0 | 0.43 | 0 |
| $Eu_2O_3$ | 0 | 0 | 0 | 0 | 0 | 0 | 0 | 0.426 |
| | Sample | | | | | | | |
| | 9 | 10 | 11 | 12 | 13 | 14 | 15 | 16 |
| $SiO_2$ | 70.24 | 70.24 | 70.24 | 70.24 | 70.24 | 70.24 | 70.24 | 70.24 |
| $Al_2O_3$ | 13.29 | 13.29 | 13.29 | 13.29 | 13.29 | 13.29 | 13.29 | 13.29 |
| $B_2O_3$ | 1.68 | 1.68 | 1.68 | 1.68 | 1.68 | 1.68 | 1.68 | 1.68 |
| MgO | 4.32 | 4.32 | 4.32 | 4.32 | 4.32 | 4.32 | 4.32 | 4.32 |
| CaO | 5.57 | 5.57 | 5.57 | 5.57 | 5.57 | 5.57 | 5.57 | 5.57 |
| SrO | 1.19 | 1.19 | 1.19 | 1.19 | 1.19 | 1.19 | 1.19 | 1.19 |
| BaO | 3.61 | 3.61 | 3.61 | 3.61 | 3.61 | 3.61 | 3.61 | 3.61 |
| ZnO | 0 | 0 | 0 | 0 | 0 | 0 | 0 | 0 |
| SnO | 0 | 0.26 | 0.26 | 0.26 | 0.26 | 0.26 | 0.26 | 0.26 |

TABLE 1-continued

|  |  |  |  |  |  |  |  |  |
|---|---|---|---|---|---|---|---|---|
| F⁻ | 8.52 | 8.52 | 3.82 | 0.852 | 1.92 | 8.53 | 8.521 | 3.83 |
| CeO$_2$ | 0.852 | 0.852 | 0.852 | 3.83 | 0.43 | 0.85 | 0 | 0.85 |
| Sm$_2$O$_3$ | 0 | 0 | 0 | 0 | 0 | 0 | 0.42605 | 0 |
| Eu$_2$O$_3$ | 0.05 | 0.1 | 0.1 | 0.21 | 0 | 0 | 0.42605 | 0 |
| Ag | 0 | 0 | 0 | 0 | 0 | 0.02 | 0 | 0.02 |

|  | Sample | |
|---|---|---|
|  | 17 | 18 |
| SiO$_2$ | 70.24 | 70.24 |
| Al$_2$O$_3$ | 13.29 | 13.29 |
| B$_2$O$_3$ | 1.68 | 1.68 |
| MgO | 4.32 | 4.32 |
| CaO | 5.57 | 5.57 |
| SrO | 1.19 | 1.19 |
| BaO | 3.61 | 3.61 |
| ZnO | 0 | 0 |
| SnO | 0.26 | 0.26 |
| F⁻ | 0 | 3.83 |
| CeO$_2$ | 0.852 | 0.852 |
| Sm$_2$O$_3$ | 0 | 0 |
| Eu$_2$O$_3$ | 0.21 | 0.21 |

TABLE 2

|  | Sample | | | | | | | |
|---|---|---|---|---|---|---|---|---|
|  | 1 | 2 | 3 | 4 | 5 | 6 | 7 | 8 |
| SiO$_2$ | 49.993 | 55.8161 | 59.3308 | 61.0266 | 52.7511 | 55.2851 | 59.2315 | 59.5948 |
| Al$_2$O$_3$ | 16.0516 | 17.9212 | 19.0497 | 19.5942 | 16.9372 | 17.7507 | 19.0178 | 19.1345 |
| B$_2$O$_3$ | 1.3855 | 1.5469 | 1.6443 | 1.6913 | 1.4619 | 1.5321 | 1.6415 | 1.6516 |
| MgO | 2.0628 | 2.3031 | 2.4481 | 2.5181 | 2.1767 | 2.2812 | 2.444 | 2.459 |
| CaO | 3.7002 | 4.1312 | 4.3913 | 4.5168 | 3.9043 | 4.0919 | 4.3839 | 4.4108 |
| SrO | 1.4607 | 1.6308 | 1.7335 | 1.783 | 1.5412 | 1.6153 | 1.7306 | 1.7412 |
| BaO | 6.5572 | 7.321 | 7.782 | 8.0045 | 6.919 | 7.2514 | 7.769 | 7.8167 |
| ZnO | 0 | 0 | 0 | 0 | 0 | 0 | 0 | 0 |
| SnO | 0.421 | 0.47 | 0.4996 | 0.5139 | 0.4442 | 0.4656 | 0.4988 | 0.5018 |
| CeO$_2$ | 8.6856 | 5.9185 | 2.0567 | 0.2116 | 9.2508 | 9.6952 | 0 | 0 |
| SnO$_2$ | 0.0017 | 0.0019 | 0.002 | 0.0021 | 0.0018 | 0.0019 | 0.002 | 0.002 |
| F⁻ | 9.588 | 2.8894 | 1.0229 | 0.1044 | 4.5521 | 0 | 1.1358 | 0.5151 |
| Na$_2$O | 0.0419 | 0.0171 | 0.0104 | 0.0071 | 0.0231 | 0.0061 | 0.0109 | 0.0085 |
| Fe$_2$O$_3$ | 0.0057 | 0.0079 | 0.0088 | 0.0093 | 0.0071 | 0.0084 | 0.0088 | 0.009 |
| SO$_3$ | 0.0137 | 0.0152 | 0.0162 | 0.0167 | 0.0144 | 0.0151 | 0.0162 | 0.0163 |
| SO$_4$ | 0.0314 | 0.0095 | 0.0033 | 0.0003 | 0.0149 | 0 | 0.0037 | 0.0017 |
| Cl⁻ | 0.0001 | 0.0001 | 0.0001 | 0.0001 | 0.0001 | 0.0001 | 0.0001 | 0.0001 |
| Sm$_2$O$_3$ | 0 | 0 | 0 | 0 | 0 | 0 | 2.1053 | 0 |
| Eu$_2$O$_3$ | 0 | 0 | 0 | 0 | 0 | 0 | 0 | 2.1368 |
| Ag | 0 | 0 | 0 | 0 | 0 | 0 | 0 | 0 |

|  | Sample | | | | | | | |
|---|---|---|---|---|---|---|---|---|
|  | 9 | 10 | 11 | 12 | 13 | 14 | 15 | 16 |
| SiO$_2$ | 58.7341 | 58.2757 | 59.0069 | 58.7179 | 60.2526 | 58.5728 | 57.3788 | 59.3128 |
| Al$_2$O$_3$ | 18.8581 | 18.711 | 18.9457 | 18.853 | 19.3457 | 18.8063 | 18.423 | 19.044 |
| B$_2$O$_3$ | 1.6277 | 1.615 | 1.6353 | 1.6273 | 1.6698 | 1.6233 | 1.5902 | 1.6438 |
| MgO | 2.4235 | 2.4046 | 2.4348 | 2.4229 | 2.4862 | 2.4169 | 2.3676 | 2.4474 |
| CaO | 4.3471 | 4.3132 | 4.3673 | 4.3459 | 4.4595 | 4.3352 | 4.2468 | 4.39 |
| SrO | 1.7161 | 1.7027 | 1.724 | 1.7156 | 1.7604 | 1.7113 | 1.6765 | 1.733 |
| BaO | 7.7038 | 7.6436 | 7.7395 | 7.7016 | 7.9029 | 7.6826 | 7.526 | 7.7797 |
| ZnO | 0 | 0 | 0 | 0 | 0 | 0 | 0 | 0 |
| SnO | 0 | 0.4907 | 0.4969 | 0.4945 | 0.5074 | 0.4932 | 0.4832 | 0.4995 |
| CeO$_2$ | 2.0408 | 2.0249 | 2.0503 | 2.0403 | 1.0566 | 2.0305 | 0 | 2.0561 |
| SnO$_2$ | 0 | 0.002 | 0.002 | 0.002 | 0.0021 | 0.002 | 0.002 | 0.002 |
| F⁻ | 2.2529 | 2.2353 | 1.0173 | 1.0123 | 0.5208 | 2.2491 | 2.2009 | 1.0226 |
| Na$_2$O | 0.0144 | 0.0149 | 0.0104 | 0.0103 | 0.0086 | 0.015 | 0.0147 | 0.0104 |
| Fe$_2$O$_3$ | 0.0083 | 0.0084 | 0.0088 | 0.0087 | 0.0091 | 0.0085 | 0.0083 | 0.0088 |
| SO$_3$ | 0.016 | 0.0159 | 0.0161 | 0.016 | 0.0165 | 0.016 | 0.0157 | 0.0162 |
| SO$_4$ | 0.0074 | 0.0073 | 0.0033 | 0.0033 | 0.0017 | 0.0074 | 0.0072 | 0.0033 |
| Cl⁻ | 0 | 0.0001 | 0.0001 | 0.0001 | 0.0001 | 0.0001 | 0.0001 | 0.0001 |
| Sm$_2$O$_3$ | 0 | 0 | 0 | 0 | 0 | 0 | 2.0207 | 0 |
| Eu$_2$O$_3$ | 0.2498 | 0.5345 | 0.5412 | 1.0282 | 0 | 0 | 2.0385 | 0 |
| Ag | 0 | 0 | 0 | 0 | 0 | 0.0299 | 0 | 0.0303 |

TABLE 2-continued

| | Sample | |
|---|---|---|
| | 17 | 18 |
| $SiO_2$ | 59.3226 | 58.6679 |
| $Al_2O_3$ | 19.0471 | 19.3624 |
| $B_2O_3$ | 1.644 | 1.625 |
| MgO | 2.4478 | 2.4622 |
| CaO | 4.3907 | 4.3749 |
| SrO | 1.7332 | 1.713 |
| BaO | 7.7809 | 7.7065 |
| ZnO | 0 | 0 |
| SnO | 0.4996 | 0.4938 |
| $CeO_2$ | 2.0613 | 2.0375 |
| $SnO_2$ | 0.002 | 0.002 |
| $F^-$ | 0 | 0.4788 |
| $Na_2O$ | 0.0066 | 0.0214 |
| $Fe_2O_3$ | 0.009 | 0.02 |
| $SO_3$ | 0.0162 | 0.006 |
| $SO_4$ | 0 | 0.0016 |
| $Cl^-$ | 0.0001 | 0.0001 |
| $Sm_2O_3$ | 0 | 0 |
| $Eu_2O_3$ | 1.0388 | 1.0268 |
| Ag | 0 | 0 |

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A glass comprising fluoride and one or more rare earth metal oxides, wherein the fluoride has a content of at least 0.38 mol. % and the one or more rare earth metal oxides has a content of at least 0.42 mol. %, wherein the glass is alkali-free, and wherein the glass has a sharpness absorption greater than zero and an absorption cut off controllable between 300 nm and 450 nm.

2. The glass of claim 1, wherein the sharpness absorption is Sharpness greater than 0.05 OD/mm/nm.

3. The glass of claim 1, wherein the absorption cut off is less than 370 nm.

4. The glass of claim 1, wherein the glass is capable of being exposed to UV radiation while still functioning as a glass.

5. The glass of claim 1, wherein the glass is made from a fusion draw process or float process.

6. A glass comprising, in weight percent on an oxide basis in the ranges:
   $SiO_2$ 45-65
   $Al_2O_3$ 10-25
   $B_2O_3$ 0-5
   MgO 0-5
   CaO 0-8
   SrO 0-5
   BaO 0-10,
   wherein the glass further comprises fluoride having a content of at least 0.38 mol. % and one or more rare earth metal oxides including $Ce_2O_3$ having a content of at least 0.42 mol. %, wherein the glass is alkali-free, and wherein the glass has a sharpness absorption greater than zero and an absorption cut off controllable between 300 nm and 450 nm.

7. The glass of claim 6 further comprising SnO or $SnO_2$ between 0 to 2 weight percent.

8. The glass of claim 6 further comprising $Eu_2O_3$ between 0 to 5 weight percent.

9. The glass of claim 6 further comprising $Sm_2O_3$ between 0 to 5 weight percent.

10. The glass of claim 6, wherein the glass is capable of being exposed to UV radiation while still functioning as a glass.

11. The glass of claim 6 further comprising less than 1 weight percent $Na_2O$, $Fe_2O_3$, $SO_3$, $SO_4$, and Ag.

12. An alkali-free glass comprising, in weight percent on an oxide basis in the ranges:
    $SiO_2$ 49-62
    $Al_2O_3$ 16-20
    $B_2O_3$ 1-2
    MgO 2-3
    CaO 3-5
    SrO 1-2
    BaO 6-8.5
    $Ce_2O_3$ >0 to 10
    $Sm_2O_3$ 0-2.5
    $Eu_2O_3$ 0-2.5,
    wherein the glass further comprises fluoride having a content of at least 0.38 mol. %, wherein one or more rare earth metal oxides including $Ce_2O_3$, $Sm_2O_3$, and $Eu_2O_3$ has a content of at least 0.42 mol. %, and wherein the glass has a sharpness absorption greater than zero and an absorption cut off controllable between 300 nm and 450 nm.

13. The glass of claim 12 further comprising SnO or $SnO_2$ between 0 to 2 weight percent.

14. The glass of claim 12 further comprising less than 1 weight percent $Fe_2O_3$, $SO_3$, $SO_4$, and Ag.

15. The glass of claim 12, wherein the glass is capable of being exposed to UV radiation while still functioning as a glass.

16. A display device comprising the glass of claim 1.

17. The glass of claim 1, wherein the glass comprises in weight percent on an oxide basis in the ranges:
    $SiO_2$ 45-65
    $Al_2O_3$ 10-25
    $B_2O_3$ 0-5

MgO 0-5
CaO 0-8
SrO 0-5
BaO 0-10
$Ce_2O_3$ up to 15.

18. The glass of claim 1, wherein the fluoride has a content in a range from 1.92 mol. % to 19.2 mol. %.

19. The glass of claim 1, wherein the one or more rare earth metal oxides are selected from the group consisting of $Ce_2O_3$, $Eu_2O_3$, $Sm_2O_3$, and combinations thereof.

20. The glass of claim 1, wherein the one or more rare earth metal oxides include $Ce_2O_3$ having a content in a range from 0.43 mol. % to 4.3 mol. % in the glass.

* * * * *